July 17, 1928. 1,677,409

F. ROTTMANN ET AL

ABSORPTION PLANT FOR GASES AND VAPORS

Filed July 6, 1925

Witness:
Almina Edgar

Inventors:
Fritz Rottmann
Friedrich Brohmeyer
by Locke, Kehlenbeck & Farley
Attorneys.

Patented July 17, 1928.

1,677,409

UNITED STATES PATENT OFFICE.

FRITZ ROTTMANN AND FRIEDRICH BROHMEYER, OF BOVINGHAUSEN, GERMANY.

ABSORPTION PLANT FOR GASES AND VAPORS.

Application filed July 6, 1925, Serial No. 41,723, and in Germany July 10, 1924.

For the absorpton of gases and vapors, particularly of nitrous gases in the manufacture of nitric acid, usually iron or stone towers arranged in series are employed and in these towers the medium is absorbed by a suitable liquid led through said towers either in the same direction as the medium, or in opposition thereto. Absorption plants of this kind are not only in use in connection with coke ovens of collieries but also in large chemical works. Since the material of such absorption plants is strongly subjected to internal influences, as for instance to fluctuations in the temperature, to acid or alkaline gases and the like, as well as to the external influences of the weather, serious leakages often appear shortly after the installation of such plants. These leakages not only hasten the destruction of the absorption plant itself but also act to impair the proper working of the entire establishment and thus cause material as well as pecuniary losses. Besides this, absorption plants of this kind demand almost constantly extensive and costly repairs.

By means of an absorption plant carried out in accordance with our present invention all such losses and repairs are prevented. Our improved absorption plant is composed of a plurality of absorption towers arranged concentrically one to another in such a manner that the concentrated gaseous medium introduced into the centrally arranged cylindrical absorption tower travels from thence in due succession outward through the annular absorption towers arranged around it. By means of this arrangement any gases or vapors which by chance may find their way through a leak in the mantle material of any one of said towers will be absorbed without loss by the adjacent and subsequent tower or towers. If desirable, a solution adapted to readily absorb the medium may be introduced into the last or outermost annular absorption tower to absorb the last traces of the medium. This result can for instance be attained by means of alkaline sprays when the medium consists of acid gases. Our improved absorption plant therefore offers not only the advantage of an absolute gas- and liquid-tight exterior but it also assures great savings in space and material, a simpler attendance than hitherto, an increased absorption capacity, and greater possibilities for a more intensive liquid spraying.

In the accompanying drawing illustrating our invention by way of example:

The tower-shaped housing H of the absorption plant consists of a substructure $a$, a floor $b$ either solid or built up of several layers of different materials, as shown, and a reinforced superstructure $c$ crowned by a roof $c^1$ formed like the segment of a sphere. The material of this housing may vary from case to case in accordance with the process and the nature of the gases or vapors under consideration. It is however advisable, though not always necessary, to employ at least for the dished layer $b^1$ of the floor $b$ an acid-proof material. The housing H is preferably circular in shape but may be of polygonal or any other suitable configuration.

Figure 1:
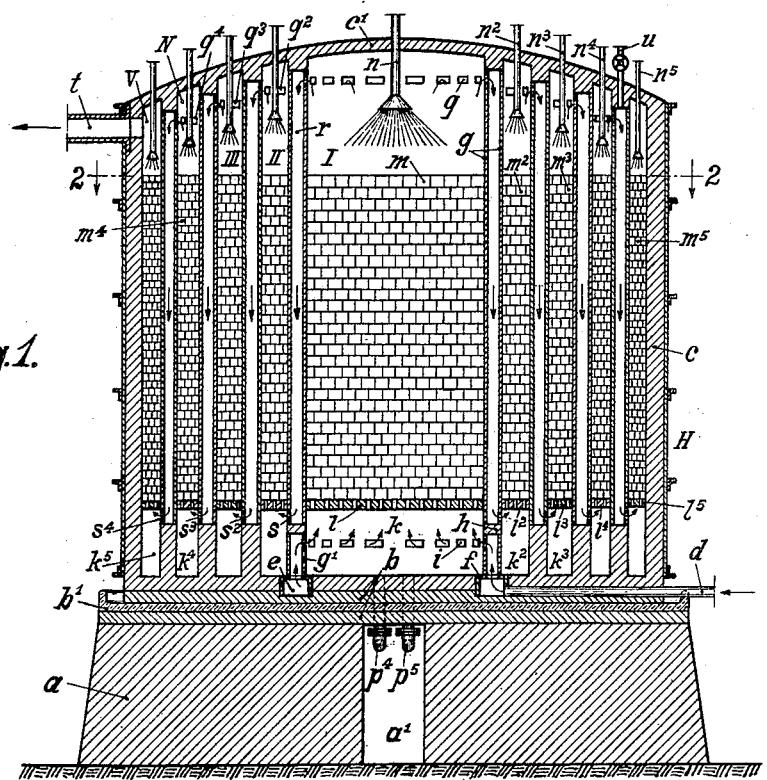
Figure 1 is a vertical sectional view of the improved absorption plant.
Figure 2:
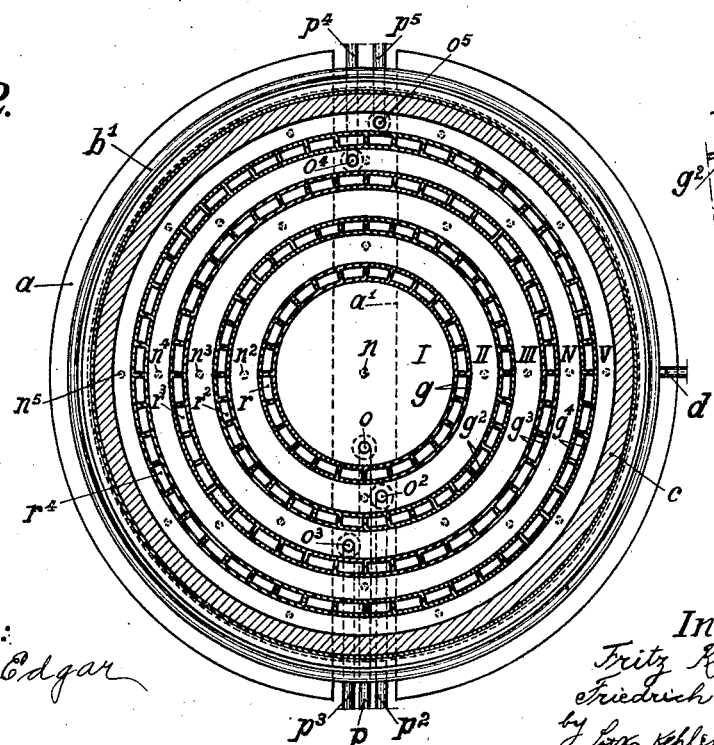
Figure 2 is a cross sectional view taken on line 2—2 of Figure 1.
Figure 3:
Figure 3 shows one way among others of arranging annular filling-rings to obtain a labyrinth of passages for the ascending gaseous medium.

Within the superstructure $c$ are arranged upon the floor $b$ the absorption towers I, II, III, IV and V concentrically one to another. The gaseous medium to be absorbed is introduced in its highest concentrated state into the absorption plant by means of a pipe or conduit $d$ from which it flows into an annular distribution channel $e$. The latter is covered by a perforated bearing ring $f$ adapted to sustain the multi-channelled mantle $g$ of the centrally arranged cylindrical absorption tower I. From this tower mantle the mantle base $g^1$ is separated by a partition $h$ to compel the medium to pass from said distribution channel $e$ through openings $i$ of the likewise multi-channelled mantle base into the bottom space $k$ of the tower I. Upon the perforated bottom or grate $l$ annular fillings $m$ of an acid-proof or of any other suitable solid material are arranged in layers, as indicated in Figures 1 and 3, or they may be thrown into it at random. These fillings may, however, be replaced by suitably sized fragments of a material adapted to suit the peculiarities of the gases or vapors to be absorbed, it being understood that the filling is sufficiently loose to afford a passage for the gases and vapors. When the medium leaves the bottom space $k$ it passes successively through the grate $l$ and the fillings $m$ upward and in doing this encounters an absorbent, here an absorbing liquid or solution, introduced from above into the tower I by means of a spraying device $n$ suspended from the roof $c^1$ as shown in Figure 1 and also indicated by dotted lines in Figure 2. The part of the medium absorbed by the descending liquid or solution collects with the latter in the bottom space $k$ whence the medium-laden liquid passes through an outlet $o$ into a pipe $p$ arranged in a tunnel $a^1$ of the substructure $a$ and is then conducted by it to a point where it is finally utilized. That part of the medium not yet absorbed by the liquid passes through inwardly opening inlets $q$ into vertical channels $r$ of the tower mantle $g$, wherein it is led downward and finally leaves them through outwardly opening outlets $s$ to enter into the bottom space $k^2$ of the annular absorption tower II. From here the medium passes through the annular grate $l^2$ and the fillings $m^2$ piled up thereon in a similar manner as it previously passed through the grate $l$ and the fillings $m$. In so doing the medium encounters the absorbing liquid introduced into the tower II by spraying devices $n_2$ shown in full lines in Figure 1 and indicated by dotted lines in Figure 2. Hereby another part of the medium is absorbed and removed from the tower II through an outlet $o^2$ connected with a discharge pipe $p^2$, see Figure 2. The rest of the medium hereafter flows into the mantle $q^2$ of the absorption tower II and thence into the absorption tower III in exactly the same maner as previously the medium passed from the tower I to the tower II. These proceedings are repeated until the last remnant of the medium has been introduced into the absorption tower V which only differs in this respect from the other towers that its mantle is not channelled like the tower mantles, $g, g^2, g^3$ and $g^4$ but is of a solid construction, since it is formed of the wall of the superstructure $c$. This path of the medium is made easily and clearly traceable by the aid of indexed letters of reference and arrows. In the absorption tower V the last traces of the medium may be retained by the introduction of a suitable liquid or solution through the spraying device $n^5$, if deemed necessary. The purified final product is sucked off from this absorption tower, or it is allowed to escape into the air by an outlet pipe $t$ shown in Figure 1. Just as the contents of the absorption tower V may be influenced from without so the medium may be made to undergo an especial treatment or an oxidation while contained in the vertical channels of the different tower mantles. This can be easily brought about by any gaseous or liquid means adapted to influence the medium in the desired manner. The introduction of such means into said channels may for instance be accomplished by the aid of valved pipes $u$ passed through the roof of the housing into some, or into all of said channels as deemed necessary, of which pipes one is shown in Figure 1.

By leading the medium through the absorption plant in the manner illustrated in Figure 1 the particular and very valuable advantage is gained that in case the medium passes through a defective or leaky mantle of any one of the absorption towers it will not be lost but will be taken up by the adjacent annular tower or the subsequent towers, wherein it will be absorbed and compelled to take part in the operation going on therein. Since the outer tower mantle only comes into contact with a part of the medium practically bare of any absorbable elements no losses need be feared, even though this mantle should become defective.

We claim:—

1. An absorption plant for a gaseous medium comprising a tower-shaped housing, a cylindrical absorption tower arranged centrally in said housing, a plurality of annular absorption towers surrounding said cylindrical tower concentrically, annular tower mantles connecting said absorption towers one with another, each mantle having a plurality of vertical channels, a grate in each absorption tower, means for leading the gaseous medium to be absorbed beneath the grate of said cylindrical absorption tower, the inlets for the said gaseous medium being at the lower portions of the respective absorption towers, fillings arranged on said grates for distributing the ascending medium, spraying means in each of said absorption towers for distributing an absorbing liquid over said fillings, and means for removing the medium-laden absorbing liquid from each absorption tower separately.

2. An absorption plant for a gaseous medium comprising a circular tower-shaped housing, a cylindrical absorption tower arranged centrally in said housing, a plurality of annular absorption towers concentrically surrounding said cylindrical tower, annular tower mantles interposed between the respective absorption towers, each mantle having vertically arranged channels and being provided at the top with an inwardly directed inlet and at the bottom with an outwardly directed outlet, the said mantles effecting communication between adjacent absorption towers, a grate arranged in each of said absorption towers, fillings piled up on each of said grates, means for leading the gaseous medium to be absorbed beneath the grate of said cylindrical absorption tower, spraying means suspended from the ceiling of each absorption tower and adapted for distributing an absorbing liquid over said fillings, and means for leading off the medium-laden absorbing-liquid from each absorption tower separately.

3. An absorption plant for a gaseous medium comprising a circular tower-shaped housing, a cylindrical absorption tower arranged centrally in said housing, a plurality of annular absorption towers arranged concentrically around said cylindrical absorption tower; a hollow tower mantle for each absorption tower, excepting the outermost, each mantle having a plurality of vertical channels and being provided with an inlet at the top and an outlet at the bottom, the said mantles effecting communication between adjacent absorption towers, a cylindrical casing for the outermost absorption tower formed by the wall of the superstructure of said housing, a grate in each absorption tower, ring-shaped fillings piled up on said grates, liquid spraying means suspended in each absorption tower from the roof of said housing, an annular hollow base arranged below the mantle of said cylindrical absorption tower and provided with outlets opening inwardly beneath the grate of said cylindrical absorption tower, an annular distribution channel arranged in the floor of said housing and communicating with said hollow base, means for leading the gaseous medium to be absorbed to said annular distribution channel, and means for leading off the medium-laden absorbing liquid from each absorption tower separately.

4. An absorption plant for a gaseous medium comprising a circular tower-shaped housing, absorption towers arranged in said housing concentrically one to another, a hollow tower mantle interposed between adjoining absorption towers, each mantle having vertically arranged channels each provided with a top inlet and a bottom outlet and adapted to be utilized as a vessel for an especial treatment of the medium, means for introducing for such treatment fluid means into said channels, a mantle for the outermost annular absorption tower consisting of the wall of the superstructure of said housing, the said mantles effecting communication between adjacent absorption towers, an annular base arranged below the mantle of the innermost absorption tower and provided with inwardly opening outlets, a covered annular distribution channel arranged in the floor of said housing and communicating with said annular base, means for introducing the medium to be absorbed into said annular channel, a circular grate arranged in said innermost absorption tower above the outlets of said base, an annular grate arranged in each of said annular absorption towers above the outlets of the mantle of the adjacent inwardly arranged absorption tower, ring-shaped fillings arranged on said grates, spraying means in each absorption tower, and means in each absorption tower for removing the medium-laden absorbent from the bottom space thereof.

5. A compact absorption plant including a substantially cylindrical casing having a roof and a floor section, a plurality of spaced substantially cylindrical partitions extending from the roof of said casing to the floor thereof defining a cylindrical central tower, a plurality of annular towers surrounding said cylindrical tower and a plurality of annular hollow mantles separating said towers, means for introducing a gaseous medium to one of said towers, means for introducing an absorbing fluid to each of said towers, said partitions being apertured alternately at the top and bottom thereof whereby a zig-zag course for said gaseous medium is provided, a grate in each of said towers for supporting a column of porous material and conduits for removing the medium-laden absorbing fluid.

Signed by us at Cologne, Germany, this 17th day of June, 1925.

FRITZ ROTTMANN.
Dr. FRIEDRICH BROHMEYER.